(12) United States Patent
Xiao et al.

(10) Patent No.: US 9,538,229 B2
(45) Date of Patent: Jan. 3, 2017

(54) MEDIA EXPERIENCE FOR TOUCH SCREEN DEVICES

(75) Inventors: Hong Xiao, Acton, MA (US); Afshin Moshrefi, Newburyport, MA (US); Rahul Khushoo, Waltham, MA (US); Changqing Wang, Acton, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 917 days.

(21) Appl. No.: 12/882,476

(22) Filed: Sep. 15, 2010

(65) Prior Publication Data

US 2012/0062473 A1    Mar. 15, 2012

(51) Int. Cl.
| | |
|---|---|
| *G06F 3/041* | (2006.01) |
| *H04N 7/16* | (2011.01) |
| *H04N 21/4147* | (2011.01) |
| *H04N 5/76* | (2006.01) |
| *H04N 21/433* | (2011.01) |

(52) U.S. Cl.
CPC ............ *H04N 21/4147* (2013.01); *H04N 5/76* (2013.01); *H04N 21/4333* (2013.01)

(58) Field of Classification Search
CPC ... H04N 21/4147; H04N 21/4333; H04N 5/76
USPC .................. 345/173; 715/764; 725/135, 109
See application file for complete search history.

(56) References Cited

U.S. PATENT DOCUMENTS

| | | | |
|---|---|---|---|
| 2007/0083911 A1* | 4/2007 | Madden et al. .............. | 725/135 |
| 2008/0088602 A1* | 4/2008 | Hotelling ....................... | 345/173 |
| 2009/0300530 A1* | 12/2009 | Falchuk ........................ | 715/764 |
| 2010/0100915 A1* | 4/2010 | Krikorian et al. ............ | 725/109 |

* cited by examiner

*Primary Examiner* — Andrew Sasinowski
*Assistant Examiner* — Kuo Woo (57) ABSTRACT

A method may include receiving and outputting a selected multimedia stream at a mobile device. It is determined that a user wishes to browse other available multimedia streams. The selected multimedia stream is paused while the user browses the other available multimedia streams. The selected multimedia stream is cached while the user browses the other available multimedia streams. It is determined that the user has finished browsing the other available multimedia streams. The cached multimedia stream is output.

23 Claims, 8 Drawing Sheets

MEDIA EXPERIENCE FOR TOUCH SCREEN DEVICES

BACKGROUND INFORMATION

Portable media devices may include applications for receiving and displaying media content in a variety of formats, such as audio content, video content, Internet-based content (e.g., media streams), etc. Such devices may be provided with touch screen-based interfaces for receiving user interactions with displayed images or content.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

One or more embodiments disclosed herein may enable a user to easily view and navigate streamed multimedia content on a mobile touch screen device, such as a mobile telephone or tablet computing device that includes a touch screen display. Exemplary media streams may include live television or Internet-based real time video streams. In one implementation, the mobile device may provide users with a multi-part display interface, with a first portion of the interface displaying currently selected media stream and a second portion of the display interface providing an initial grouping of one or more icons, thumbnails, or previews of other streaming media content items available for selection by the user.

A user may interface with the second portion via the touch screen display to enlarge the second portion relative to the first portion. In this manner, the user may view additional icons or previews than those included in the initial grouping. Enlarging the second portion may cause at least a portion of the first portion and the currently selected media content to become obscured or to be no longer visible on the touch screen. In some implementations, an entirety of the touch screen display may provide the second portion of the display interface.

Based on the navigation or the duration of the navigation, the mobile device may pause or stop the playback of the currently selected media stream and store subsequently received content associated with the currently selected media stream. The received content may be stored or "cached" while the user views or navigates through the icons for the other multimedia content items available for selection. If the user does not select any other multimedia content item for streaming, the device may automatically resume playback of the currently selected media stream based on the stored content.

In this manner, the user of the mobile device may navigate through available multimedia content using the extent of the touch screen display without losing their place or missing content associated with the currently selected media stream.

Figure 1A:
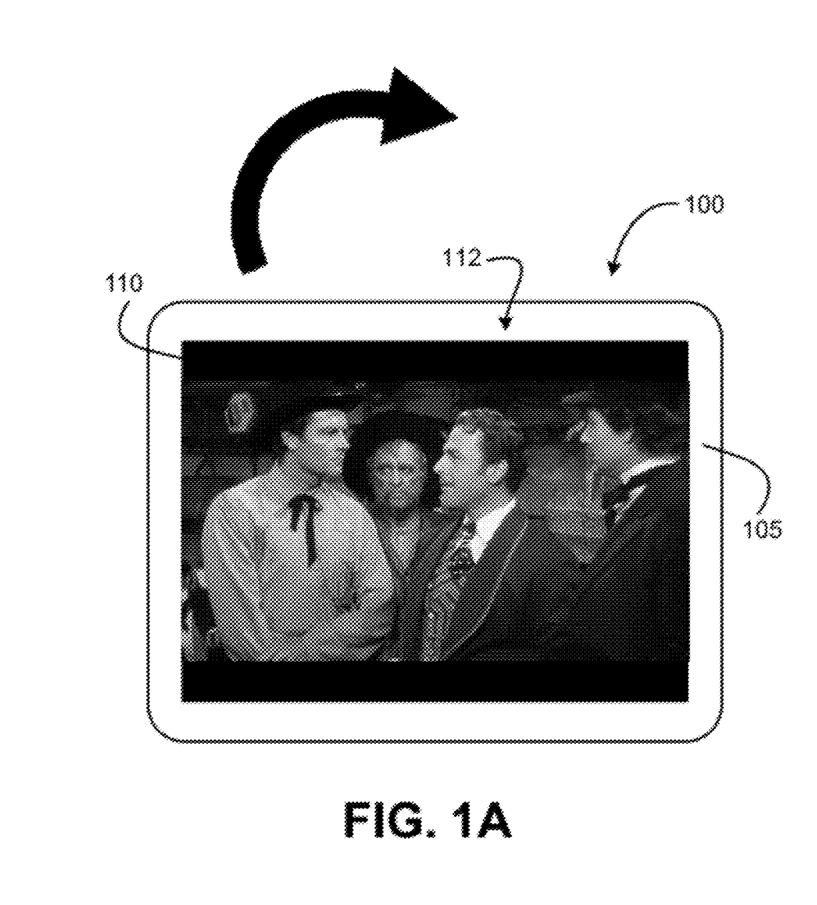
FIG. 1 illustrates an exemplary overview of embodiments disclosed herein.
Figure 1B:
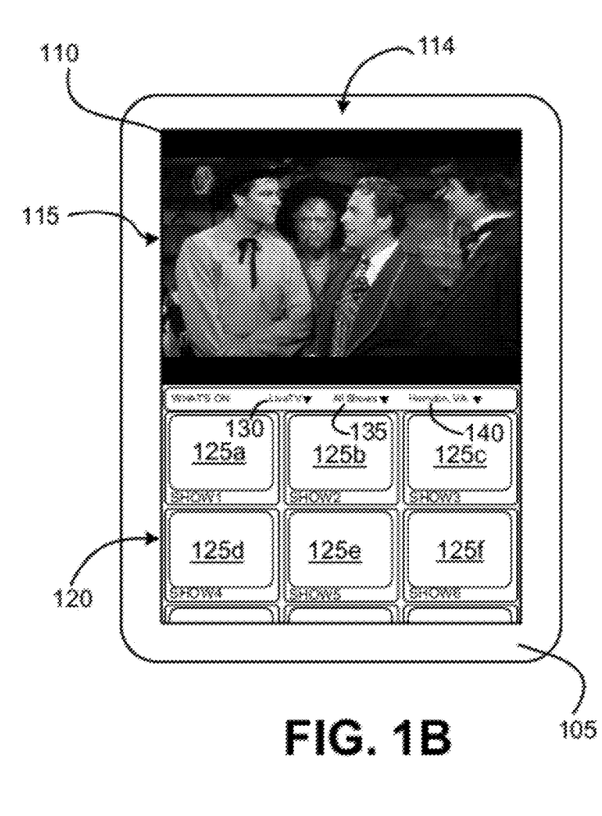

FIGS. 1A and 1B are diagrams of an exemplary user device 100 in two different orientations, with FIG. 1A illustrating device 100 in a landscape orientation and FIG. 1B illustrating device 100 in a portrait orientation. As used herein, the term "landscape orientation" refers to a display orientation having a greater width and height (also referred to as a "widescreen orientation"), and the term "portrait orientation" refers to a display orientation having a greater height than width. As illustrated, user device 100 may include a housing 105 and a touch screen display 110. Although not shown in FIGS. 1A and 1B, user device 100 may include additional components, such as a speaker, a microphone, one or more control buttons (e.g., volume buttons, etc.), a gyroscope or other device for determining an orientation of device 100, etc.

Housing 105 may house the components of device 100 and may protect device 100 from damage by environmental elements. Touch screen display 110 may include a display screen to provide visual information to the user. For example, as shown in FIGS. 1A and 1B, touch screen display 110 may output video content and other graphical elements to a user. In addition, touch-screen display 110 may accept user input, such as input via the user's fingers or other input device such as a stylus, etc.

As shown in FIG. 1A, user device 100 may output a landscape orientation GUI 112 when in the first, landscape mode of operation. Landscape orientation GUI 112 may provide a selected media stream or other video content in a full screen mode on display 110. Consistent with implementations described herein, an output of user device 100 may change when the orientation of user device 100 is changed to the second, portrait mode of operation. In the portrait mode, as shown in FIG. 1B, touch screen display 110 may provide a portrait orientation GUI 114 that includes two display portions, a first portion 115 for displaying the selected media stream or other video content, and a second portion 120 for displaying a listing or grid of other available content or media streams (e.g., television shows or channels, movies, etc.).

As shown in FIG. 1B, in one implementation, second portion 120 may include a grid that includes a number of graphical elements 125a through 125f that correspond to the available media streams (collectively referred to as "graphical elements 125"). In some implementations, graphical elements 125 may include thumbnail images or icons associated with the available content. In other implementations, graphical elements 125 may include miniature versions of the videos that correspond to available content items. In still other implementations, graphical elements 125 may include low-resolution or reduced frame rate versions of the multimedia streams.

Figure 2:
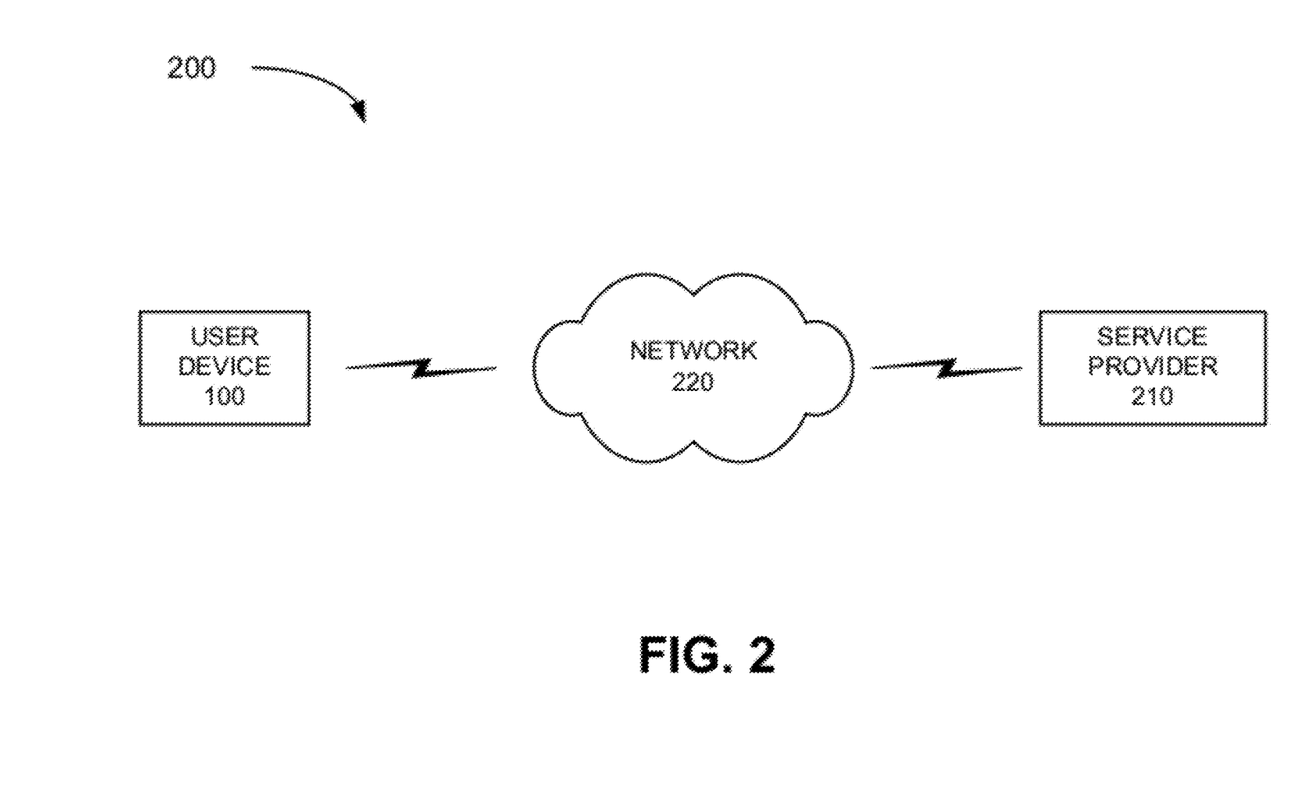
FIG. 2 is a block diagram of an exemplary network in which embodiments described herein may be implemented.

FIG. 2 is a block diagram of an exemplary network 200 in which systems and methods described herein may be implemented. Network 200 may include user device 100, service provider 210, and network 220. User device 100 may connect to network 220 and/or each other via wired, wireless or optical communication mechanisms. In other embodiments, network 200 may include more, fewer, or different devices. For example, although a single user device 100, service provider 210, and network 220 have been illustrated in FIG. 2 for simplicity, in operation, there may be more user devices 100, service providers 210, and/or networks 220. Also, in some instances, one or more of the components of network 200 may perform one or more functions described as being performed by another one or more of the components of network 200.

User device 100 may connect to service provider 210 via network 220. More specifically, consistent with embodiments described herein, user device 100 may receive a plurality of multimedia streams (e.g., from service provider 210), and provide one or more of the streams to a user via display 110. As briefly described above, user device 100 may allow a user to alter the content displayed thereon based on user interactions received via touch screen display 110.

Service provider 210 may include one or more server entities, or other types of computation or communication devices, that gather, process, search, and/or provide information in a manner described herein. In one implementation, service provider 210 may include a server (e.g., a computer system or an application), a cable head-end, or a broadcaster capable of providing multimedia content (e.g., TV programming, movies, on-demand services, live television, media streams), advertisements, instructions, codes, encryption keys, and/or other information associated with products and/or services, etc., to user device 100. In some implementations, service provider 210 may be configured to receive information from user device 100 in the manner described below. In other implementations, one or more other devices (not shown), such as a set top box (STB), a home router, etc. may be provided in network 200 for interfacing between user device 100 and service provider 210.

Network 220 may include a local area network (LAN), a wide area network (WAN), a metropolitan area network (MAN), a telephone network, such as the Public Switched Telephone Network (PSTN), an intranet, the Internet, an optical fiber (or fiber optic)-based network, or a combination of networks.

The exemplary configuration illustrated in FIG. 2 is provided for simplicity. It should be understood that a typical network may include more or fewer devices than those illustrated in FIG. 2. For example, other devices that facilitate communications between the various entities illustrated in FIG. 2 may also be included in network 200.

Figure 3:
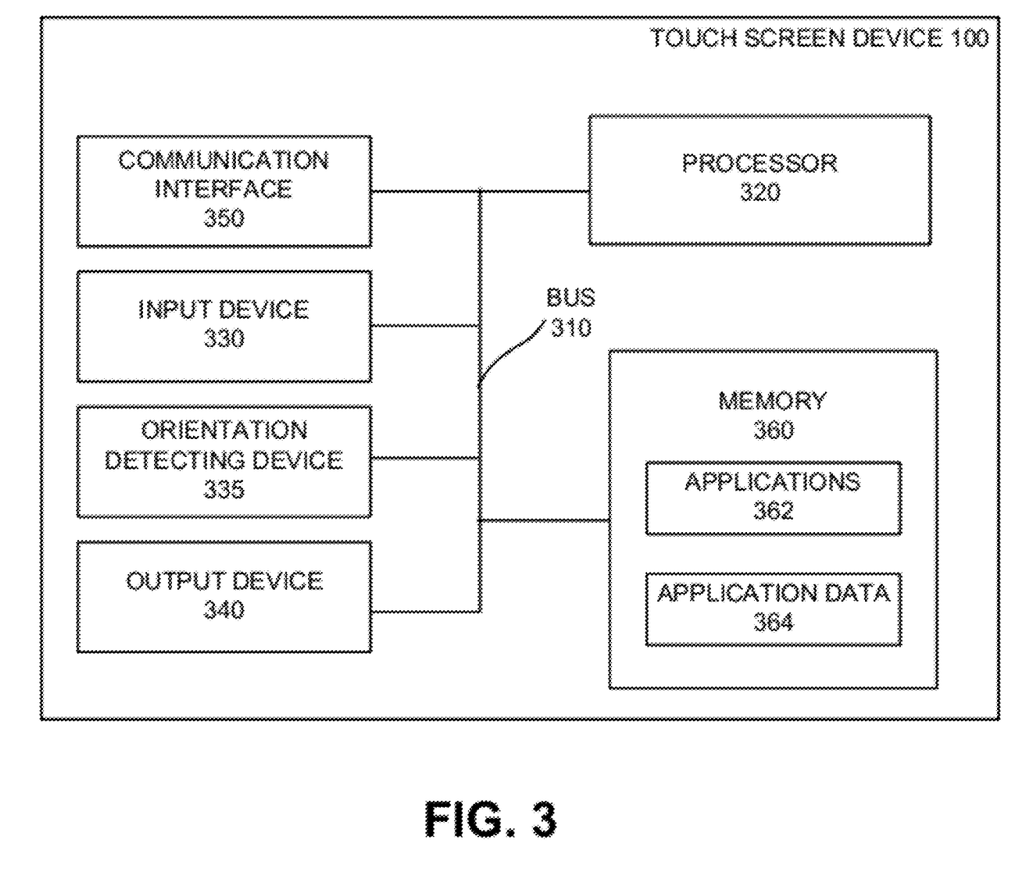
FIG. 3 is a block diagram of exemplary components of the touch screen device of FIG. 3.

FIG. 3 is an exemplary diagram illustrating components of user device 100 according to an exemplary implementation. User device 100 may include a bus 310, processor 320, input device 330, orientation detecting device 335, output device 340, communication interface 350, and memory 360. User device 100 may include other components (not shown) that aid in receiving, transmitting, and/or processing data, such as image data, video data, or audio data. Moreover, other configurations of components in user device 100 are possible.

Bus 310 may include a path that permits communication among the components of client/server entity 300. Processor 320 may include any type of processor or microprocessor (or groups of processors or microprocessors) that interprets and executes instructions. In other embodiments, processing logic 320 may include an application-specific integrated circuit (ASIC), a field-programmable gate array (FPGA), or the like.

Input device 330 may include a device that permits a user to input information into user device 100, such as a keyboard, keypad, or control buttons, a mouse, a pen or stylus, a microphone, a remote control, a touch-screen display (e.g., touch screen display 110), a camera or video camera, etc. Orientation detecting device 335 may include a device that detects the physical orientation of user device 100. For example, orientation detecting device 335 may include one or more gyroscope devices for determining whether user device 100 is in a first orientation (e.g., a landscape orientation) or a second orientation (e.g., a portrait orientation). Output device 340 may include a device that outputs information to the user, such as a display (e.g., touch screen display 110), a printer, a speaker, etc.

Input device 330 and output device 340 may allow the user to activate a particular service or application, such as an application to browse and play media content. Input device 330 and output device 340 may allow the user to receive and view a menu of options and select options from the menu. The menu may allow the user to select various functions or services associated with applications executed by user device 100. For example, the menu may allow the user to select a particular media stream (e.g., a television channel) and play content associated with the stream.

Communication interface 350 may include a transceiver that enables user device 100 to communicate with other devices and/or systems. Communication interface 350 may include a wired and/or wireless transmitter and a wireless and/or wired receiver. Communications interface 350 may include a network interface card, e.g., Ethernet card, for wired communications, or a wireless network interface (e.g., a WiFi, WiMAX, or HSDPA) card for wireless communications. Communication interface 350 may also include, for example, a universal serial bus (USB) port for communications over a cable, a Bluetooth wireless interface for communicating with Bluetooth devices, etc.

Memory 360 may include a random access memory (RAM) or another type of dynamic storage device that may store information and instructions, e.g., an application, for execution by processor 320; a read-only memory (ROM) device or another type of static storage device that may store static information and instructions for use by processor 320; and/or some other type of magnetic or optical recording medium and its corresponding drive, e.g., a hard disk drive (HDD), for storing information and/or instructions.

Memory 360 may include one or more applications 362 and application data 364. In the case user device 100, applications 362 may include a media viewing application (e.g., a television application) for enabling users to browse, select, and view media content from service provider 210. Application data 364 may include a cache or other memory structure for buffering or receiving content associated with one or more selected media content items (e.g., streams).

User device 100 may perform certain operations, as described herein. User device 100 may perform these operations in response to processor 320 executing software instructions contained in a computer-readable medium, such as memory 360. A computer-readable medium may be defined as a physical or logical memory device. The software instructions may be read into memory 360 from another computer-readable medium or from another device via communication interface 350. The software instructions contained in memory 360 may cause processor 320 to perform processes that are described herein.

Figure 4:
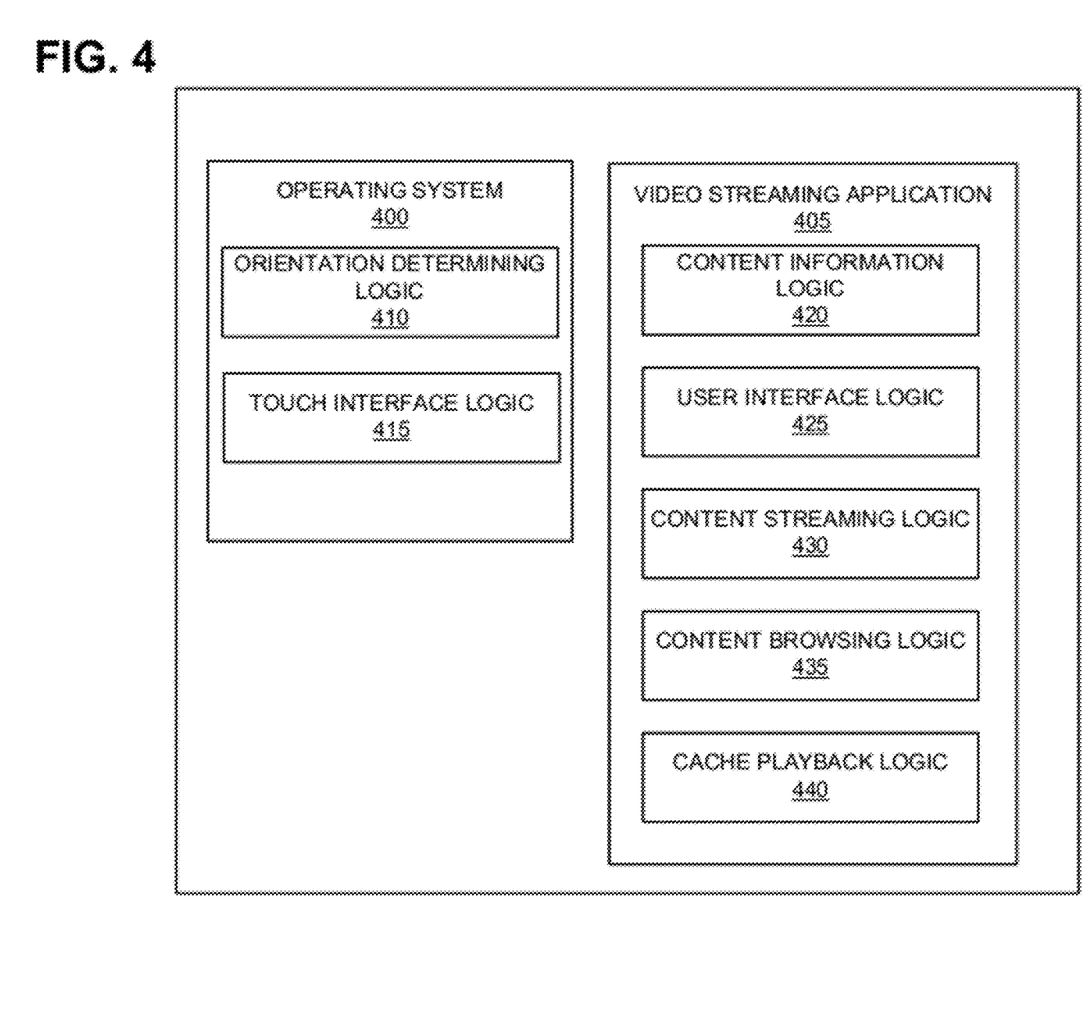
FIG. 4 is an exemplary block diagram of components implemented in the touch screen device of FIG. 1.

FIG. 4 is an exemplary block diagram of components implemented in user device 100 of FIG. 1. In an exemplary implementation, all or some of the components illustrated in FIG. 4 may be stored in memory 360. For example, referring to FIG. 4, memory 360 may include an operating system (OS) 400 and a video streaming application 405. OS 400 may include orientation determining logic 410 and touch interface logic 415. Video streaming application 405 may include content information logic 420, user interface logic 425, content streaming logic 430, content browsing logic 435, and cache playback logic 440. The components illustrated in FIG. 3 may be implemented by processor 320 executing one or more programs stored in memory 360.

Operating system 400 may include software instructions for managing hardware and software resources of user device 100. Operating system 300 may manage, for example, its file system, device drivers, communication resources (e.g., radio receiver(s), transmission control protocol (TCP)/IP stack), event notifications, etc. Operating system 300 may include Symbian®, Android™, Windows Mobile®, Apple® OS X or iOS, etc.

Orientation determining logic 410 may receive orientation related information from, for example, orientation detecting device 335. Orientation determining logic 410 may make an orientation determination based on the received information and may make the orientation determination available to applications 362, such as video streaming application 405.

Touch interface logic 415 may determine information relating to user interaction with touch screen 110. For example, touch interface logic 415 may determine one or more points or locations of a user's touch or contact (also referred to as "touch points," "touch input," or "contact points") as well as motions associated with the identified touch points. For example, touch interface logic may determine a location of a touch on touch screen 110, the movement of the touch, and the speed of the movement. As with the orientation determination, touch information may be made available to applications 362, such as video streaming application 405.

Video streaming application 405 may include a software program or an element of a software program (e.g., a process) executed by processor 320 that enables a user to select and view (or "play") a multimedia stream from a number of available media streams. In one implementation, video streaming application 405 may receive user commands to output media content via touch screen display 110. Exemplary multimedia streams include live television shows, real time web videos, video chats, on demand media streams, etc. As used herein, the phrase "video streaming application" may refer to any application that outputs or otherwise displays a video via touch screen display 110. Video streaming application 405 may include a stand-alone application for accessing, requesting, and streaming media from service provider 210 via network 220. In other implementations, video streaming application 405 may be included within another application, such as a web browser application via, for example, a plug-in or other application infrastructure.

Content information logic 420 may include one or more logic components for receiving information relating to available media streams from service provider 210 via network 220. For example, content information logic 420 may receive content information such as file metadata associated with each available media stream. Exemplary metadata includes name or title information, preview graphic information, sample clip information, icon information, genre information, actor/artist information, etc. In other implementations, the content information may include a reduced resolution media stream associated with live (e.g., real time) multimedia streams. Content information logic 420 may store the received information in a database or other memory structure, e.g., in memory 360.

User interface logic 425 may present or display graphical information via touch screen display 110. For example, as described briefly above with respect to FIGS. 1A and 1B, user interface logic 425 may include logic receiving orientation information from orientation determining logic 410 and providing a graphical user interface (GUI). More specifically, when user interface logic 425 determines that device 100 is in a first orientation (e.g., a landscape orientation), as shown in FIG. 1A, user interface logic 425 may output landscape GUI 112 primarily devoted to displaying output corresponding to a selected media stream. However, when user interface logic 425 determines that device 100 is in a second orientation (e.g., a portrait orientation), as shown in FIG. 1B, user interface logic 425 may output portrait GUI 114 that includes first portion 115 and second portion 120.

When in the second orientation, user interface logic 425 may use the content information received and stored by content information logic 420 to generate graphical elements 125 in second portion 120. For example, user interface logic 425 may retrieve metadata information for a number of available multimedia streams and present the retrieved information in respective graphical elements 125.

In addition, user interface logic 425 may receive a user selection of a media stream for output in first portion 115. For example, user interface logic 425 may receive, e.g., from touch interface logic 415, an indication of a user selection of a particular graphical element 125. In some implementations, prior to selection of an initial multimedia stream (e.g., graphical element 125), user interface logic 425 may be configured to provide second portion 120 in both the first orientation and the second orientation.

In response to the selection, content streaming logic 430 may receive and output a selected media stream (e.g., a real time protocol (RTP) stream) from service provider 120 via touch screen display 110. Exemplary media streams may include audio or video streams, including substantially live audio or video streams. In one implementation, content streaming logic 430 may receive an identification of a particular multimedia stream from user interface logic 425 and establish a streaming session with service provider 210 (e.g., via communication interface 350). Content streaming logic 430 may receive a corresponding media stream from service provider 210 and output the stream to display 110 via user interface logic 425.

Figure 5A:
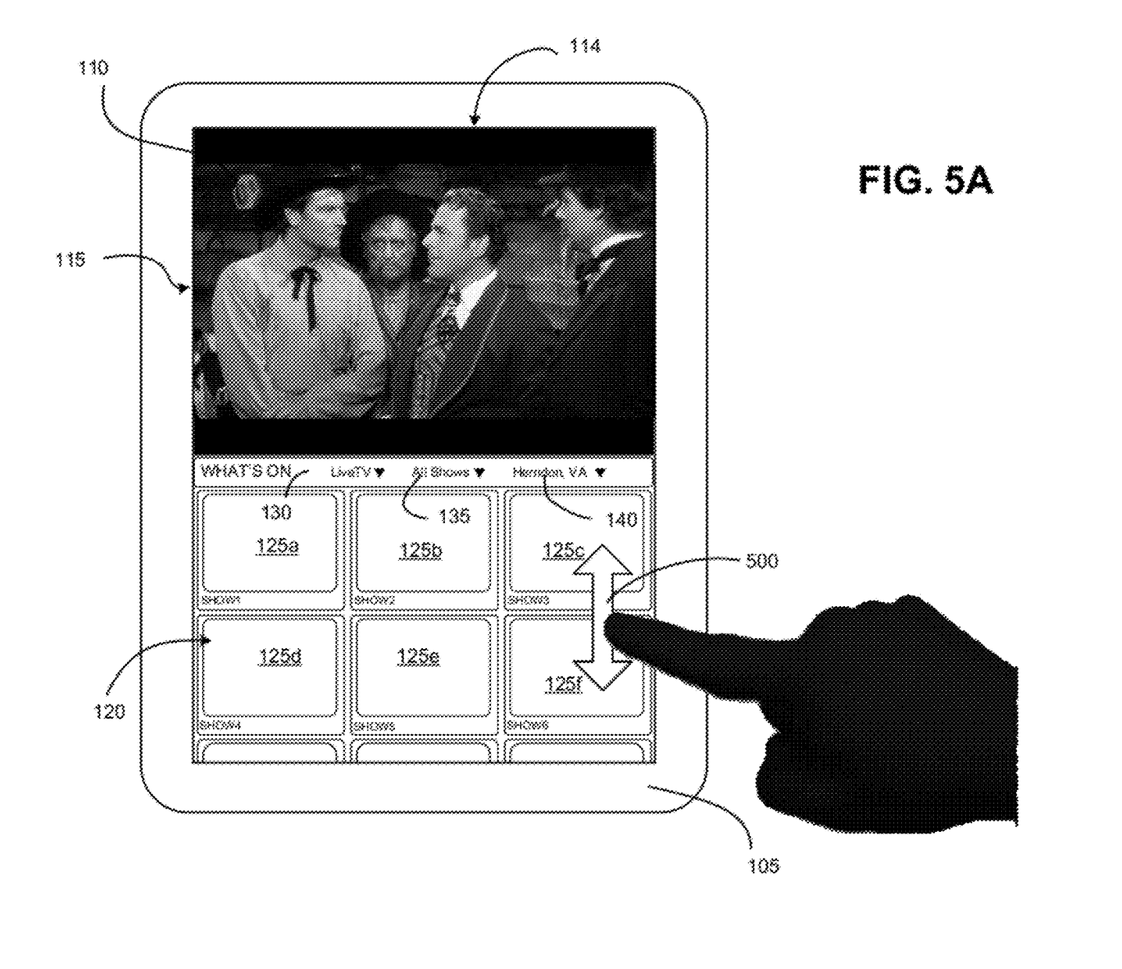
FIGS. 5A-5C are block diagrams of exemplary graphical user interfaces provided in response to received user interactions.

As briefly described above, user interface logic 425 may receive one or more user browsing commands. For example, user interface logic 425 may receive information from touch interface logic 415. The information may relate to touch input and may indicate a user wishes to view additional available media streams, as presented via second portion 120. In one implementation, touch interface logic 415 may identify touch input in second portion 120 accompanied by a vertical movement (i.e., toward or away from first portion 115) of the touch input. An example of a touch input 500 is shown in FIG. 5A.

Figure 5B:
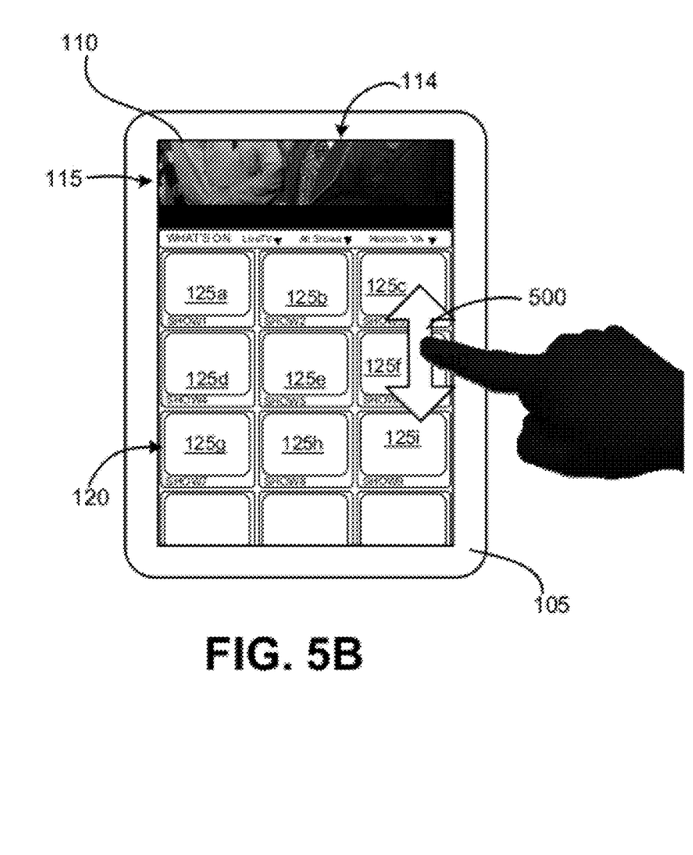
Figure 5C:
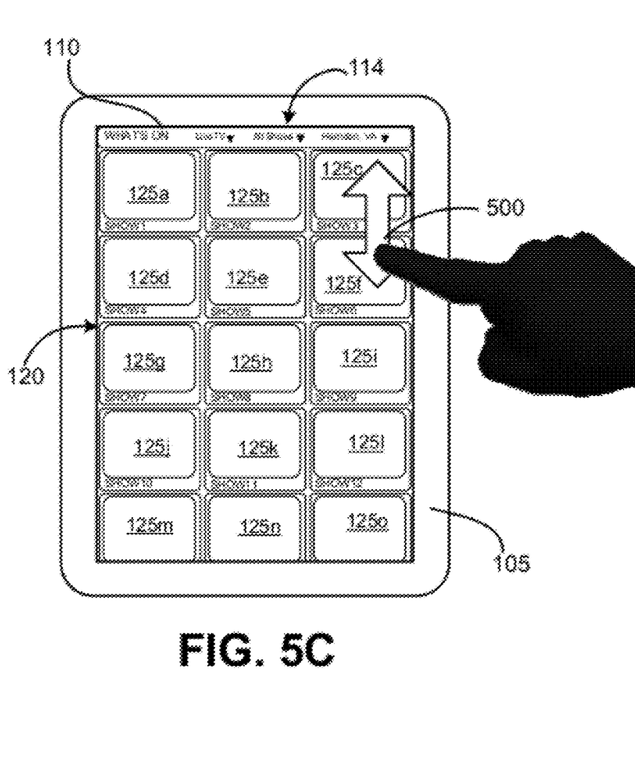

Continued vertical movement of touch input 500 may cause user interface logic 425 to increase, in display 110, the area allocated to second portion 120. For example, user interface logic 425 may interpret continued upward movement of touch input 500 in second portion 120 to mean that the user wishes to view additional available content by increasing the size of second portion 120 and decreasing the size of first portion 115. The effect of this resizing may be to slide or scroll second portion 120 upwardly in display 110 and move a portion of first portion 115 out of the viewable area of display 110. This may result in additional graphical elements 125 being presented in second portion 120. An example of this input showing a reduced first portion 115, an increased second portion 120, and the display of additional graphical elements 125g-125l is shown in FIG. 5B. Continued vertical movement of touch input 500 may cause the entirety of display 110 to present second portion 120, including graphical elements 125a-125o. An example of this input is shown in FIG. 5C. Although not depicted in FIG. 5C, continued vertical movement of touch input 500 may cause additional graphical elements 125 to be displayed in second portion 120.

Content browsing logic 435 may determine whether a user wishes to browse available content. For example, as described above, movement of second portion 120 relative to first portion 110 may cause content browsing logic 435 to determine that a user wishes to browse available content. In other instances, pre-selection of an available multimedia stream (e.g., TV show, channel, etc) may cause content browsing logic 435 to determine that a user wishes to browse available content. As used herein, pre-selection of an available multimedia stream may include interacting with a graphical element 125 in a manner that causes additional information relating to graphical element 125 to be provided. Examples of such interactions may include long touches, multi-taps, swipes, or other gestures. In some implementations, movement of second portion 120 for at least a threshold amount of time (e.g., 5-10 seconds) may indicate that the user wishes to browse the available content. In such an implementation, movement of second portion 120 for less than the threshold amount of time, may cause graphical elements 125 in second portion 120 to move within second portion, while maintaining the presence of first portion 115 on display 110.

For example, rapidly moving a touch vertically (either up or down) for a short amount of time (e.g., "flicking") may cause video streaming application 405 to scroll through graphical elements 125 for available multimedia streams in second portion 120 while maintaining output of the previously selected multimedia stream in first portion 115. However, receipt or identification of a longer duration touch may cause content browsing logic 435 to determine that a user wishes to browse available content in the manner described below.

Upon making such a determination, content browsing logic 435 may cause content streaming logic 430 and user interface logic 425 to pause or stop output of a selected stream in first portion 115. Content browsing logic 435 may then cache or store subsequent content associated with the selected stream. For example, content streamed subsequent to the browsing determination may be stored in a cache or other memory structure in memory 360. In one implementation, the selected stream may be cached using HTML5 (hypertext markup language version 5) local storage.

In some instances, a determination of whether to cache streamed content may be based at least in part on the length of time that the selected multimedia stream was viewed prior to the browsing determination. For example, a stream viewed for only 5 minutes may not be cached, while a stream viewed for 10 minutes may be cached. The viewing time associated with the selected media stream may correspond to a user interest in the media stream.

Content browsing logic 435 may continue to determine that the user is browsing available multimedia streams. For example, interactions with the GUI in second portion 120 (e.g., upward or downward movement to of second portion 120 to display additional or different graphical elements 125), selection of content filtering elements, such as content type selection element 130, genre selection element 135, and location selection element 140 shown in FIG. 1B, or pre-selection of one or more available media stream elements 125. When content browsing logic 435 continues to determine that the user is browsing available multimedia streams, streamed content associated with the currently selected multimedia stream may continued to be stored in memory 360.

However, when content browsing logic 430 determines that the user no longer wishes to browse available multimedia streams in portion 120, e.g., by expiration of a time-out period (e.g., approximately 5-10 seconds) of no user activity, interactions with the GUI to return first portion 115 to display 110, etc., cache playback logic 440 may be configured to automatically resume output of the selected multimedia stream from the stream content stored in the cache. In this manner, users may continue watching a selected multimedia stream without missing content that was received during the time in which they were browsing other content.

In some instances, content browsing logic 435 may continue to cache stream content for a predetermined period of time even after selection of another multimedia stream for viewing in first portion 115. Subsequent reselection of the initial multimedia stream may cause cache playback logic 440 to stream stored content from the cache, rather than receive live or real time content from service provider 220. An exemplary time period for caching a previously selected multimedia stream may range from 30 seconds to 30 minutes, depending on memory availability and processor requirements.

For example, assume that a first selected multimedia stream corresponds to a movie and that a second selected multimedia stream corresponds to a sporting event. By caching content associated with the movie stream for a period of time even after selection of the sporting event stream, the user is able to return to the movie stream without missing any content. This may allow a user to keep tabs on a sporting event while not missing any part of their initially selected content.

Figure 6:
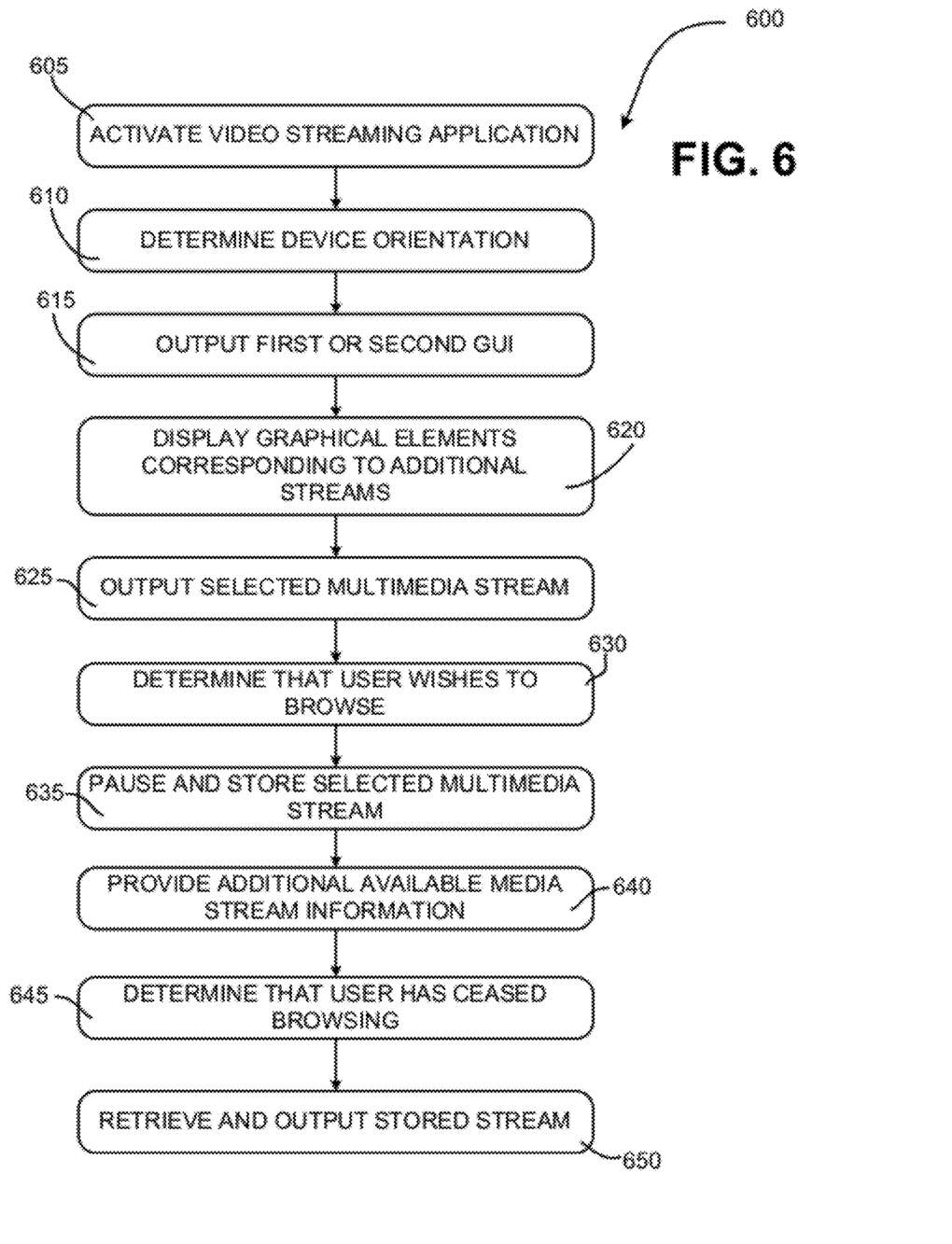
FIG. 6 is a flowchart of an exemplary process for providing touch screen based output and navigation of multimedia streams.

FIG. 6 is a flowchart of an exemplary process 600 for providing touch screen based output and navigation of multimedia streams. Process 600 may begin when a user activates video streaming application 405 (block 605). For example, OS 400 in user device 100 may receive a user selection of video streaming application 405 from among a number of available applications. In other implementations, activation of video streaming application 405 may be incorporated into another application, such as a web browser application, etc.

Video streaming application 405 may determine whether device 100 is in a first orientation or a second orientation (block 610). For example, video streaming application 405 may obtain orientation information from orientation determining logic 410. Based on this information, user interface logic 425 may output a first orientation GUI or a second orientation GUI on touch screen display 110 (block 615). As described above, the first orientation GUI may include a landscape orientation GUI that includes a display portion devoted to outputting a currently selected multimedia stream. If no multimedia stream is currently selected (e.g., when video streaming application 405 is initially started), the display portion may provide a browsing portion similar to that described below. In other embodiments, the display portion may provide content associated with a previously viewed stream, a preview stream, etc.

The second orientation GUI (e.g., the portrait orientation GUI) may include first portion 115 for outputting the currently selected media stream and second portion 120 for providing graphical representations 125. In exemplary implementations, video streaming application 405 may continually make a determination regarding the orientation of device 100, and may modify (e.g., re-orient) the provided GUI accordingly. For example, video streaming application 405 may receive updates from orientation determining logic 410 in OS 400.

When video streaming application 405 outputs the second orientation GUI, video streaming application 405 may output one or more graphical elements associated with available media streams in second portion 120 of the second orientation GUI (block 620). For example, content information logic 420 may receive/retrieve information associated with available multimedia streams from service provider 210. The received information may include stream metadata information, preview content, a graphical icon, etc. User interface logic 425 may output graphical elements 125 based on the received information. As shown in FIGS. 1B and 5A-5C, in one implementation, graphical elements 125 may be provided in a substantially grid-like arrangement.

Video streaming application 405 may output a selected multimedia stream (block 625). For example, content streaming logic 430 may receive the selected media stream from service provider 210 and output the selected media stream in first portion 115 of portrait orientation GUI 114. Receipt of the selected media stream may include establishment of any necessary streaming sessions with service provider 210.

Video streaming application 405 may determine that a user wishes to browse available multimedia streams (block 630). For example, as described above, content browsing logic 435 may determine that a user wishes to browse available multimedia streams based on one or more touch contacts or gestures identified by touch interface logic 415. In some instances, touch contacts associated with a determination that a user wishes to browse available multimedia streams may include a touch contact and corresponding vertical movement in second portion 120 of portrait orientation GUI 114.

In one implementation, the determination that a user wishes to browse available multimedia streams may be based on a duration of the touch contact(s) identified. For example, a touch contact of more than 2-5 seconds may indicate that a user wishes to browse available multimedia streams.

When it is determined that the user wishes to browse available media streams, video streaming application 405 may pause, stop, or suspend output of the selected media stream and cache or store media stream information subsequently received from service provider 210 (block 635). For example, content browsing logic 435 may suspend output of the selected multimedia stream in first portion 115 of portrait orientation GUI 114 and may store subsequently received stream information in a buffer or cache in memory 360. In some implementations, a determination to cache or store media stream information may be based on a length of time that the selected media stream was viewed prior to the determination that the user wishes to browse available media streams. For example, if a user has been viewing the selected multimedia stream for only a few minutes (e.g., less than 10) it may be determined that the user is not interested in the content, when the user decides to browse additional content. In this scenario, the media stream may not be cached during browsing.

Video streaming application 405 may provide additional available media stream information to the user (block 640). For example, as described above, user interface logic 425, based on user interactions received and interpreted by touch interface logic 415 may increase a size of second portion 120, such that additional numbers of graphical elements 125 may be presented to the user. In one implementation, the display of additional media stream information may appear as a sliding up of second portion 120 relative to first portion 115, such that some or all of first portion 115 is removed from portrait orientation GUI 114.

Video streaming application 405 may determine that a user has ceased browsing available multimedia streams (block 645). For example, content browsing logic 435 may determine that touch contacts have ceased for a predetermined period of time (e.g., 3-10 seconds). In other implementations, the determination that a user has ceased browsing available multimedia streams may be made when interactions from the user (e.g., touch contacts) withdraw (e.g., move) second portion 120 relative to first portion 115, such that first portion 115 is again displayed in portrait orientation GUI 114.

Based on the determination that the user has ceased browsing available multimedia streams, video streaming application 405 may output the stored stream content from the cache (block 650). For example, cache playback logic 440 may retrieve and output the selected stream from the cache in memory 360. In one implementation, video streaming application 405 may continue to store the stream from service provider 210 in the cache, such that subsequent playback continuity will be maintained. In additional implementations, the stream cache for the selected multimedia stream may be maintained for a predetermined length of time even when video streaming application 405 receives a user selection of another multimedia stream for playback in first portion 115. As described above, this may provide for no loss in stream information in the event of "channel surfing" or other rapid channel or stream changes.

Figure 7:
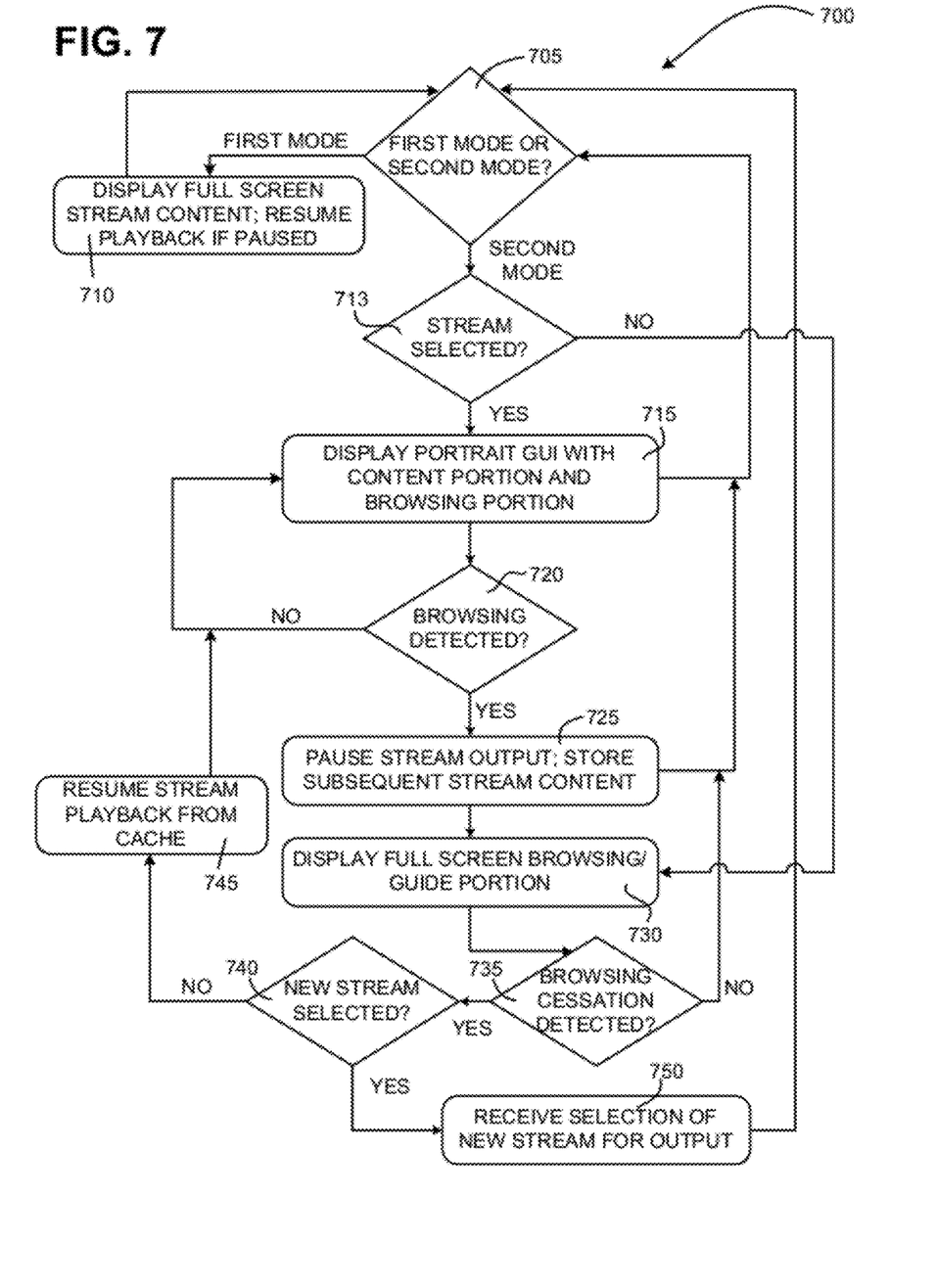
FIG. 7 is a flowchart of another exemplary process for providing touch screen based output and navigation of multimedia streams.

FIG. 7 is a flowchart of another exemplary process 700 for providing touch screen based output and navigation of multimedia streams. As described below, details of process 700 may complement or supplement process 600 described above with respect to FIG. 6. Process 700 may begin when video streaming application 405 determines whether device 100 is in the first orientation mode (e.g., the landscape mode) or the second orientation mode (e.g., the portrait mode) (block 705). For example, as described above, video streaming application 405 may obtain orientation information from orientation determining logic 410.

When it is determined that device 100 is in the first orientation mode (e.g., as shown in FIG. 1A) (block 705—FIRST MODE), video streaming application 405 may output GUI 112 on touch screen display 110 that includes full screen output of multimedia stream content (block 710). For example, when a multimedia stream has been previously selected by the user, the selected multimedia stream may be output in a manner that uses substantially the entirety of touch screen display 110. In one embodiment, if a multimedia stream has not been previously selected by the user, GUI 112 may output a browsing portion similar to browsing portion 120 in GUI 114. In this embodiment, the provided browsing portion may be output in an orientation consistent with the first orientation (e.g., the landscape orientation).

As in detail described below, when output of a selected multimedia stream has been paused or suspended based on identified user browsing, a subsequent determination that device 100 is in the first orientation mode (block 705—

FIRST MODE), video streaming application may resume output of the previously paused multimedia stream in block 710.

When it is determined that device 100 is in the second orientation mode (e.g., as shown in FIG. 1B) (block 705—SECOND MODE), video streaming application 405 may then determine whether a multimedia stream has been previously selected for output on display 110 (block 713). For example, assume that a user initially opened or activated video streaming application 405 and had not yet selected a multimedia stream for viewing. In this instance it may be determined that a multimedia stream has not been selected for display (block 713—NO). Processing may then proceed to block 730 described below, for output of a full screen browsing portion.

However, when the user was previously viewing a media stream in first mode GUI 112 and switched device 100 to the second orientation mode, it may be determined that multimedia stream has not been selected for display (block 713—YES), video streaming application 405 may output GUI 114 on touch screen display 110 that initially includes a split screen having a content portion (e.g., portion 115), and a browsing portion (e.g., portion 120) (block 715). When in this initial display mode (e.g., a split screen mode or a dual function mode), content portion 115 may output the previously selected multimedia stream and browsing portion 120 may display graphical elements or a listing of other available multimedia streams. In some implementations, browsing portion 120 may appear as an interactive program guide that provides available multimedia content in a timeline view or calendar/agenda view.

Video streaming application 405 may determine whether user browsing is detected (block 720). For example, similar to block 630 in FIG. 6, browsing logic 435 may determine that the user wishes to browse available multimedia streams (beyond those initially provided in browsing portion 120) be detecting user touches and/or gestures. For example, touch interface logic 415 may determine a location and/or a motion associated with a touch. Browsing logic 435 may receive information regarding the determined touch location and/or a motion and determine that the user wishes to browse available multimedia streams.

If user browsing is not detected (block 720—NO), processing may return to block 715 for continued presentation of the initially split screen GUI 114. Further, at any point in process 700, video streaming application 405 may determine that device 100 has returned to the first orientation mode (e.g., as in block 705). If so, video streaming application 405 may switch to the full screen mode (e.g., first orientation mode GUI 112).

If user browsing is detected (block 720—YES), video streaming application 405 may pause, stop, or suspend output of the selected media stream and cache or store media stream information subsequently received from service provider 210 (block 725). For example, content browsing logic 435 may pause the currently selected multimedia stream in first portion 115 of second orientation mode GUI 114 and may store subsequently received stream information in a buffer or cache in memory 360.

Consistent with implementations described herein, video streaming application 405 may display a full screen browsing portion 120 to provide additional available media stream information to the user (block 730). For example, as described above, user interface logic 425, based on user interactions received and interpreted by touch interface logic 415 may increase a size of browsing portion 120, such that additional numbers of graphical elements 125 may be presented to the user. In other implementations, a time-based program guide may be displayed in browsing portion 120.

Video streaming application 405 may determine whether user browsing has ceased (block 735). For example, browsing logic 435 may determine that a user touch has not been received within a threshold time period. In other implementations, a video streaming application 405 may receive a user selection of a "done" or "exit" command, e.g., via touch interface logic 415. Alternatively, it may be determined that browsing has ceased upon receipt of a user selection of a different multimedia stream for viewing in content portion 115.

If user browsing has not ceased (block 735—NO), processing may return to block 720 for continued caching of stream content and display of the full screen browsing portion. However, when it is determined that user browsing has ceased (block 735—YES), video streaming application 405 may determine whether selection of a new multimedia stream has been received (block 740). If not (block 740—NO), for example, when the user discontinues browsing actions (such as scrolling, previewing, etc.) for a predetermined length of time, or selects "done" or "exit" buttons (now shown), video streaming application may return to the split screen interface and resume output of the cached stream in content portion 115.

However, when video streaming application 405 determines that selection of a new multimedia stream has been received (block 740—YES), video streaming application 305 may receive selection of the new stream (block 750) and return to block 705 for output of the content in either first orientation mode GUI 112 or second orientation mode GUI 114.

A substantially improved multimedia stream viewing and browsing experience is provided by allowing users of touch screen mobile devices to quickly and easily switch between a full screen viewing mode, a slit screen viewing mode, or a full screen browsing mode, based on the orientation of the device and interactions received from the user.

The foregoing description of exemplary implementations provides illustration and description, but is not intended to be exhaustive or to limit the embodiments described herein to the precise form disclosed. Modifications and variations are possible in light of the above teachings or may be acquired from practice of the embodiments.

For example, various features have been mainly described above with respect to a user device configured to provide communications functionality. In other implementations, features described herein may be implemented mainly in one or more devices that are remote from a mobile or portable device, such as a web server or similar device accessed via, e.g., network 240. For example, the user device may be configured to display contact information received from a remote network device.

Further, while series of acts have been described with respect to FIGS. 6 and 7, the order of the acts may be varied in other implementations. Moreover, non-dependent acts may be implemented in parallel.

It will also be apparent that various features described above may be implemented in many different forms of software, firmware, and hardware in the implementations illustrated in the figures. The actual software code or specialized control hardware used to implement the various features is not limiting. Thus, the operation and behavior of the features of the invention were described without reference to the specific software code—it being understood that one would be able to design software and control hardware to implement the various features based on the description herein.

Further, certain features described above may be implemented as "logic" that performs one or more functions. This logic may include hardware, such as one or more processors, microprocessors, application specific integrated circuits, field programmable gate arrays, or processing logic, software, or a combination of hardware and software.

While particular graphical user interfaces have been described and shown in FIGS. 5, 6A-6E, 8, and 9 these interfaces or screens are purely exemplary. In other embodiments, the interfaces or screens may have different, additional, or differently arranged information and graphics.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A computing-device implemented method, comprising:
   receiving a selected multimedia stream at a mobile device;
   outputting the selected multimedia stream;
   determining that a user wishes to browse other available multimedia streams;
   pausing the selected multimedia stream when it is determined that the user wishes to browse the other available multimedia streams;
   determining an amount of time that the selected multimedia stream was being output prior to pausing the selected multimedia stream;
   determining a user interest in the selected multimedia stream based on the amount of time that the selected multimedia stream was being output prior to pausing the selected multimedia stream;
   determining whether to cache the selected multimedia stream based on the user interest in the selected multimedia stream;
   caching, when it is determined to cache the selected multimedia stream, the selected multimedia stream by storing, in a memory, content of the selected multimedia stream that is received while the selected multimedia stream is paused, and while the user browses the other available multimedia streams;
   determining that the user has finished browsing the other available multimedia streams; and
   outputting the cached multimedia stream based on determining that the user has finished browsing the other available multimedia streams.

2. The method of claim 1, wherein receiving the selected multimedia stream comprises:
   receiving the selected multimedia stream from a service provider via a wireless network.

3. The method of claim 1, wherein the selected multimedia stream comprises a real time media stream.

4. The method of claim 1, further comprising:
   outputting a graphical user interface comprising a first portion that includes the selected multimedia stream and a second portion that includes a number of the other available multimedia streams.

5. The method of claim 4, wherein the mobile device comprises a touch screen display.

6. The method of claim 5, wherein determining that that the user wishes to browse other available multimedia streams comprises:
   receiving a user interaction via the touch screen display, wherein the user interaction comprises at least a touching of the second portion of the graphical user interface.

7. The method of claim 6, wherein the user interaction comprises a touch movement from the second portion of the graphical user interface toward the first portion of the graphical user interface.

8. The method of claim 6, further comprising:
   increasing a size of the second portion relative to the first portion in response to the user interaction to display additional ones of the other available multimedia streams.

9. The method of claim 6, wherein determining that that the user wishes to browse other available multimedia streams is based on a duration of the touching of the second portion.

10. The method of claim 6, wherein determining that the user has finished browsing the other available multimedia streams comprises receiving a second user interaction via the touch screen display or removal of the user interaction with the second portion.

11. The method of claim 1, wherein outputting the cached multimedia stream provides the selected multimedia stream to the user without loss of content.

12. The method of claim 1, further comprising:
    continuing to cache the selected multimedia stream during the outputting of the cached multimedia stream.

13. The method of claim 1, further comprising:
    determining an orientation of the mobile device;
    providing a first graphical user interface when the mobile device is in a first orientation; and
    providing a second graphical user interface when the mobile device is in a second orientation,
    wherein determining that the user wishes to browse other available multimedia streams is performed when the mobile device is in the second orientation.

14. The method of claim 13, wherein the first orientation comprises a landscape or widescreen orientation and the second orientation comprises a portrait orientation.

15. The method of claim 1, further comprising:
    automatically displaying a first graphical user interface that includes a full screen browsing portion when it is determined that the user wishes to browse other available multimedia streams.

16. The method of claim 15, further comprising:
    automatically displaying a second graphical user interface that includes a first portion that includes the selected multimedia stream and a second portion that includes a number of the other available multimedia streams when it is determined that the user has finished browsing the other available multimedia streams.

17. A mobile device, comprising:
    a touch screen display to display content and receive user interactions with the content;

a communication interface to receive a plurality of multimedia streams from a service provider via a network;
a memory; and
a processor to:
    output a selected multimedia stream from the plurality of multimedia streams via the touch screen display;
    determine that a user wishes to browse other available multimedia streams from the plurality of multimedia streams;
    pause the output of the selected multimedia stream when it is determined that the user wishes to browse the other available multimedia streams;
    determine a length of time that the selected multimedia stream was being output prior to being paused;
    determine a user interest in the selected multimedia stream based on the length of time that the selected multimedia stream was being output prior to being paused;
    determine whether to store content of the selected multimedia stream based on the user interest in the selected multimedia stream;
    store the content of the selected multimedia stream that is received while the output of the selected multimedia stream is paused in the memory while the user browses the other available multimedia streams when it is determined to store the content of the selected multimedia stream;
    determine that the user has finished browsing the other available multimedia streams;
    retrieve the stored selected multimedia stream from the memory based on determining that the user has finished browsing the other available multimedia streams; and
    output the stored selected multimedia stream via the touch screen display.

18. The mobile device of claim 17, wherein the plurality of multimedia streams comprise a plurality of real time multimedia streams.

19. The mobile device of claim 17, wherein the processor is configured to:
    output a graphical user interface via the touch screen display,
    wherein the graphical user interface comprises a first portion that includes the selected multimedia stream and a second portion that includes graphical elements associated with a number of other available multimedia streams.

20. The mobile device of claim 19, wherein the graphical elements comprise icons, images, video previews, or live versions of the number of other available multimedia streams.

21. The mobile device of claim 19, wherein the processor is further configured to determine that the user wishes to browse other available multimedia streams based on user interactions with the graphical elements.

22. The mobile device of claim 21, wherein the processor is further configured to determine that the user has finished browsing the other available multimedia streams based on a cessation of the user interactions with the graphical elements.

23. A non-transitory computer-readable memory device including instructions executable by at least one processor, the non-transitory computer-readable memory device comprising one or more instructions to:
    receive a selected multimedia stream at a mobile device including a touch screen display;
    output the selected multimedia stream via at least a portion of the touch screen display;
    determine that a user wishes to browse other available multimedia streams based on interactions with the touch screen display;
    pause the selected multimedia stream while the user browses the other available multimedia streams;
    determine an amount of time that the selected multimedia stream was being output;
    determine a user interest in the selected multimedia stream based on the amount of time that the selected multimedia stream was being output;
    determine whether subsequently received content of the selected multimedia stream should be stored based on the user interest in the selected multimedia stream;
    store the subsequently received content of the selected multimedia stream in a memory when it is determined that the user wishes to browse the other available multimedia streams and when it is determined that the subsequently received content should be stored;
    determine that the user has finished browsing the other available multimedia streams; and
    output the stored subsequently received content of the selected multimedia stream based on determining that the user has finished browsing the other available multimedia streams.

* * * * *